US008505289B2

(12) United States Patent
Harsia

(10) Patent No.: US 8,505,289 B2
(45) Date of Patent: Aug. 13, 2013

(54) FIXED/VARIABLE HYBRID SYSTEM

(75) Inventor: Jarmo Antero Harsia, Lincolnshire, IL (US)

(73) Assignee: Parker Hannifin Corporation, Cleveland, OH (US)

( * ) Notice: Subject to any disclaimer, the term of this patent is extended or adjusted under 35 U.S.C. 154(b) by 0 days.

(21) Appl. No.: 13/385,946

(22) Filed: Mar. 15, 2012

(65) Prior Publication Data

US 2012/0180472 A1 Jul. 19, 2012

Related U.S. Application Data

(63) Continuation of application No. 12/220,331, filed on Jul. 23, 2008, now abandoned.

(60) Provisional application No. 60/951,560, filed on Jul. 24, 2007.

(51) Int. Cl.
*F16D 31/02* (2006.01)

(52) U.S. Cl.
USPC .................. 60/430; 60/421; 60/452; 60/484; 60/486

(58) Field of Classification Search
USPC .................. 60/420, 421, 428, 430, 452, 484, 60/486
See application file for complete search history.

(56) References Cited

U.S. PATENT DOCUMENTS

| | | | |
|---|---|---|---|
| 3,191,382 | A | 6/1965 | Weisenbach |
| 3,962,870 | A | 6/1976 | Lech |
| 3,971,216 | A | 7/1976 | Miller |
| 3,985,472 | A | 10/1976 | Virtue et al. |
| 4,050,477 | A | 9/1977 | Acar |
| 4,050,478 | A | 9/1977 | Virtue |
| 4,231,396 | A | 11/1980 | Budzich |
| 4,359,130 | A | 11/1982 | Kirkham |
| 4,383,412 | A | 5/1983 | Presley |
| 4,385,674 | A | 5/1983 | Presley |
| 4,635,439 | A | 1/1987 | Wible |
| 5,165,862 | A | 11/1992 | Lindblom |
| 5,261,232 | A | 11/1993 | Maffini et al. |
| 6,029,445 | A | 2/2000 | Lech |
| 6,170,412 | B1 | 1/2001 | Memory et al. |
| 6,425,244 | B1 | 7/2002 | Ohashi et al. |
| 6,736,605 | B2 | 5/2004 | Ohashi et al. |
| 2005/0210871 | A1 | 9/2005 | Lech et al. |

FOREIGN PATENT DOCUMENTS

| | | |
|---|---|---|
| WO | WO 81/03471 | 7/1982 |

*Primary Examiner* — Michael Leslie

(74) *Attorney, Agent, or Firm* — Renner, Otto, Boisselle & Sklar, LLP

(57) ABSTRACT

A fixed/variable hybrid system has modified constant flow open center hydraulic valves ("fixed/variable valves"), including an open center core, spools, a power core, and a tank galley. A small fixed displacement pump provides fluid at a constant rate to the open center core. A variable displacement piston pump provides fluid directly to the power core as needed. Activation of spools partially restricts the open center core causing an increase in fluid pressure that is communicated to the variable displacement piston pump's load sense signal port, causing the pump to increase fluid flow and pressure to the power core. Activated spools direct pressurized fluid from the power core to the applications through selected hydraulic ports. Activated spools also direct fluid flow from selected hydraulic ports via the tank galley to a hydraulic tank. Pumping the majority of fluid only on an as-needed basis results in significant efficiencies.

12 Claims, 5 Drawing Sheets

FIXED/VARIABLE HYBRID SYSTEM

CROSS-REFERENCE TO RELATED APPLICATIONS

This application is a continuation for U.S. application Ser. No. 12/220,331, filed Jul. 23, 2008, now abandoned which, in turn, claims the benefit of and priority from U.S. provisional application Ser. No. 60/951,560, filed Jul. 24, 2007, all of the disclosures of which are incorporated herein by reference.

BACKGROUND OF THE INVENTION

1. Field of the Invention

The present invention relates to hydraulic valve systems used, for example, in off-road earth moving, construction, and forestry equipment, such as backhoes, log loaders, feller bunchers, wheel loaders, and the like. Hydraulic valve systems are utilized, for example, to cause pistons to move a boom or bucket loader in a backhoe. The present invention relates to an improved design for such hydraulic valve systems.

2. Brief Description of the Related Art

Prior art hydraulic valve systems include the open center hydraulic valve system 110 illustrated in FIG. 1. The open center hydraulic valve system 110 in FIG. 1 is illustrated in a hydraulic circuit diagram in schematic form as would be understood by a skilled practitioner. The open center hydraulic valve system 110 of FIG. 1 presently is in common use, for example, in off-road earth moving, construction, and forestry equipment.

While variations in the basic design of such a prior art open center hydraulic valve system 110 exist, the fundamental components and operation of such a system are briefly described below.

The prior art open center hydraulic valve system 110 of FIG. 1 typically includes a hydraulic fluid tank 112, one or more constant flow open center hydraulic valve banks ("valves") 114, and a fixed displacement pump 116. Each valve 114, in turn, may include one or more spools 118, with each spool 118 being activated by a spool actuator 120. The spool actuators 120 may be activated by an equipment operator using a number of known means (not illustrated), such as mechanically (for example, using a lever), electrically (for example, using a solenoid receiving an electrical signal from a switch, a joystick, a computer, or other means), hydraulically, pneumatically, or otherwise.

In order to illustrate the operation of a spool 118 to selectively interconnect hydraulic pathways within a valve, a simplified set of drawings illustrating how a spool 118 of a simple prior art constant flow open center ("CFO") valve 136 is capable of redirecting the constant flow of hydraulic fluid is provided in FIGS. 2A, 2B, and 2C. There, spool 118 is capable of providing selective hydraulic communication with either of a pair of hydraulic ports 122 and 124, depending upon the position of spool 118. The hydraulic ports 122 and 124 are hydraulically connected to a cylinder 126 on either side of a piston 128. The simple CFO valve 136 has a number of internal hydraulic pathways which permit the spool 118, depending on its position, to direct hydraulic fluid flow to or from hydraulic ports 122 and 124.

For example, in FIG. 2A, the spool 118 is in the neutral position. In that position, fixed displacement pump 116 pumps hydraulic fluid at a constant rate through open center core 130. The spool 118 does not obstruct or restrict the hydraulic fluid flow through the open center core 130, which proceeds to the tank galley 132, and then through tank galley

132 to hydraulic fluid tank 112. The spool 118 in the neutral position blocks the flow of hydraulic fluid to or from hydraulic ports 122 and 124, on the one hand, and either the open center core 130 or the tank galley 132, on the other hand. The result is that no net hydraulic fluid flows into or out of cylinder 126 either above or below piston 128. The piston 128 and associated load 134 do not raise or lower.

In FIG. 2B, on the other hand, spool 118 is caused to move to a first non-neutral position (upward) where spool 118 partially restricts the hydraulic fluid flow provided by fixed displacement pump 116 through open center core 130, raising the hydraulic pressure of the hydraulic fluid upstream of the spool 118 (i.e., between the spool 118 and the fixed displacement pump 116). The spool 118 also opens a hydraulic pathway within the simple CFO valve 136 for net hydraulic fluid to flow from the open center core 130 through hydraulic port 122 into the cylinder 126 below the piston 128. At the same time, spool 118 opens a hydraulic pathway in simple CFO valve 136 between hydraulic port 124 and the tank galley 132 allowing net hydraulic fluid to flow out of the cylinder 126 above the piston 128 to the tank galley 132 and to hydraulic fluid tank 132. The result is that there is net hydraulic fluid flow into the cylinder 126 below the piston 128 and out of the cylinder 126 above the piston 128; thus, the piston 128 and its associated load 134 is caused to rise.

Further, in FIG. 2C, spool 118 is caused to move to a second non-neutral position (downward), causing spool 118 to partially restrict the hydraulic fluid flow provided by fixed displacement pump 116 through open center core 130, raising the hydraulic pressure upstream of the spool 118. The spool 118 opens a hydraulic pathway within the simple CFO valve 136 permitting net hydraulic fluid flow from the open center core 130 through hydraulic port 124 into the cylinder 126 above the piston 128, while at the same time opening a hydraulic pathway between hydraulic port 122 and tank galley 132 allowing net hydraulic fluid to flow out of the cylinder 126 below the piston 128. The result is that the piston 128 and its associated load 134 is lowered.

The operation of the spool 118 in the prior art open center hydraulic valve system 110 is similar to the operation of the spool 118 in the prior art simple CFO valve 136 described above; however, as illustrated and disclosed in the schematic diagram of FIG. 1, the fluid pathways within prior art open center hydraulic valve system 110 that are selectively interconnected by spool 118 differ to a certain extent.

Referring once again to the prior art open center hydraulic valve system 110 illustrated in FIG. 1, each spool 118 is capable of selective hydraulic communication with a pair of associated hydraulic ports 122 and 124. Each pair of hydraulic ports 122 and 124, in turn, may communicate hydraulically with equipment applications (such as a boom on a backhoe) in which the open center hydraulic valve system 110 is used to operate, typically utilizing a cylinder and a piston. The hydraulic ports selectively provide pressurized hydraulic flow to or from the cylinder on either side of the piston.

Referring again to FIG. 1, each spool 118 of each valve 114, and, hence, each pair of hydraulic ports 122 and 124 associated with each spool 118, is associated with a function of the application on the equipment within which the open center hydraulic valve system 110 is utilized. In the example illustrated in FIG. 1, one of the spools 118 (and the associated pair of ports 122 and 124) is associated with the each of the following functions, which can be found, for example, in a backhoe: boom, bucket, stick, swing, stabilizer, boom loader, bucket loader, and auxiliary. Those functions are chosen for purposes of illustration, and, as would be recognized by skilled practitioners, those functions can vary, depending on the equipment and applications to which the open center hydraulic valve system 110 is assigned.

The valves 114 include several hydraulic fluid pathways that may be selectively interconnected by activation of the spool 118, including an open center core 130, a power core 138, and a tank galley 132. The fixed displacement pump 116 pumps hydraulic fluid (at a constant flow rate for a given engine speed) from the hydraulic fluid tank 112 into the open center core 130. The tank galley 132 returns hydraulic fluid to the hydraulic fluid tank 112, where it is available to be re-pumped. The valves 114 also include a hydraulic connection between the open center core 130 and the power core 138, namely, an open center/power core passage 140. Typically, the valves 114 may also include smaller internal valves utilized to prevent, for example, overpressure or incorrect flow direction in the system, such as relief valves 142, or load drop check valves 144, which are not material to the explanation of the prior art or the invention.

The prior art open center hydraulic valve system 110 is typically housed in a standard manifold (not illustrated) attached to the equipment (e.g., construction, earth moving, or forestry equipment, such as a backhoe) in which the open center hydraulic valve system 110 is being used. The fixed displacement pump 116 is typically driven by a power take-off (not illustrated), which, in turn, is directly mounted to a transmission (not illustrated), which is connected to the prime mover of the equipment in which the prior art open center hydraulic valve system 110 is being used.

The operation of the spools 118 in each of the valves 114 to direct hydraulic fluid flow to and to permit fluid flow from associated hydraulic ports 122 and 124 to cause, for example, a piston to move within a cylinder and thereby cause movement of a functional aspect of the equipment on which the open center hydraulic valve 110 is mounted is well-known to skilled practitioners, and can be ascertained by skilled practitioners by reference solely to the schematic diagram found in FIG. 1. For purposes of the following explanation, hydraulic ports 122 and 124 will be assumed to be hydraulically connected to a cylinder 126 above and below a piston 128, respectively, in a manner similar to that illustrated in FIGS. 2A, 2B, and 2C.

As can be seen in FIG. 1, and will be described further below, when a spool 118 is caused by spool actuator 120 to be in the neutral position (with the open center core 130 unrestricted by the spool 118, and the fluid passageways between either the open center core 130 or the tank galley 132, on the one hand, and the pair of hydraulic ports 122 and 124 associated with the spool 118, on the other hand, being obstructed by the spool 118, no net hydraulic fluid flows to or from the hydraulic ports 122 and 124 to the cylinder 126 on either side of the piston 128, and thus, the piston 128 does not move. Instead, the hydraulic fluid delivered at a constant flow rate (for a given engine speed) by the fixed displacement pump 116 flows unrestricted through the open center core 130 and through the open center of the spools 118 to the tank galley 132 and to the hydraulic fluid tank 112 where it is re-pumped. Hence, the function to which the piston 128 and cylinder 126 is associated (e.g., the position of the boom) does not change, because there is no net change in hydraulic fluid in the cylinder 126 either above or below the piston 128. The piston 128 therefore does not move.

If, as shown in FIG. 1, the spool actuator 120 is activated by an operator to cause the spool 118 to move from the neutral position to a first non-neutral position, the constant flow of hydraulic fluid delivered by the fixed displacement pump 116 is caused by the partial restriction by the spool 118 of the open center core 130 to increase in pressure. Referring to FIG. 1, the increase in fluid pressure in the open center core 130 is communicated to the power core 138 through the open center/power core passage 140. As shown in FIG. 1, the activated spool 118 allows pressurized hydraulic fluid to flow from the power core 138 to the first hydraulic port 122 associated with the activated spool 118 into the cylinder 126 under the piston 128. The activated spool 118 simultaneously allows fluid to flow out of the cylinder 126 through the second hydraulic port 124 associated with the activated spool 118 which is connected above the piston 128. That fluid flows through the tank galley 132 to the hydraulic fluid tank 112 (where it is re-pumped). Thus, the net effect is that hydraulic fluid under pressure flows into the cylinder 126 below the piston 128, and hydraulic fluid flows out of the cylinder 126 above the piston 128. This causes the piston 128 and associated load 134 to rise and the function to change (e.g., it causes the boom and any associated load to rise).

On the other hand, if, as shown in FIG. 1, the spool operator manipulates the actuator 120 to cause the spool 118 to move from the neutral position to a second non-neutral position, that once again causes partial restriction of the open center 130, and causes the fluid flowing through the open center core 130 to increase in pressure. That increase in hydraulic pressure is once again communicated from the open center core 130 to the power core 138 through open center/power core passage 140. At the same time, hydraulic fluid is allowed by the activated spool 118 to flow out of the cylinder 126 under the piston 128 through the connected hydraulic port 122 associated with activated spool 118 and through the tank galley 132 to the hydraulic fluid tank 112. Also at the same time, the spool directs pressurized fluid (under pressure from the fixed displacement pump 116 due to partial restriction of the opening in the open center core 130 by the spool 118) to flow from the power core 138 through the associated hydraulic port 124 into the cylinder 126 above the piston 128. Thus, hydraulic fluid under pressure is introduced to the cylinder 126 above the piston 128, and hydraulic fluid is drained from the cylinder 126 below the piston 128. This causes the piston 128 to lower and the equipment function to change (e.g., the boom and any associated load is caused to lower). A skilled artisan would recognize, of course, that this activation of spools 118 in the valves 114 can be utilized to operate a number of different equipment functions having moving components, and would not be limited to booms (or to backhoes).

Further details of the operation of the prior art open center hydraulic valve system 110 illustrated in FIG. 1 are described below. The explanation herein concerning the operation of a single spool 118 (and its associated pair of hydraulic ports 122 and 124) within a single valve 114 associated with a particular single function is illustrative, and is not limited to that particular single spool 118 or valve 114, and applies to other spools 118 and valves 114 within the open center hydraulic valve system 110 as well.

Because the pump for the prior art open center hydraulic system 110 is a fixed displacement pump 116, the flow of the hydraulic fluid supplied by the fixed displacement pump 116 is constant for a given engine speed for the equipment in which the prior art open center hydraulic system 110 is mounted.

When the spool actuators 120 in the valves 114 in the prior art open center hydraulic system 110 are in the neutral position, all of the associated spools 118 are likewise in the neutral position. As illustrated in FIG. 1, the centers of the valve spools 118 are open, the net flow paths to the associated hydraulic ports 122 and 124 (from the open center core 130 or the power core 138), or from the hydraulic ports 122 and 124

(to the tank galley 132), are blocked by the spools 118, and all net hydraulic fluid flow pumped by the fixed displacement pump 116 from the hydraulic fluid tank 112 at a constant flow rate flows unrestricted through the open center core 130 through the spools 118 to the tank galley 132 and then back to the hydraulic fluid tank 112 where it is again available to be pumped.

When one of the functions associated with the prior art open center hydraulic system 110 is desired to be activated, the spool actuator 120 associated with that function is activated by an equipment operator in order to move the associated spool 118 (left or right, as shown in the schematic in FIG. 1) in order to partially restrict or "pinch" the opening through the open center core 130 to the tank galley 132. This partial restriction of hydraulic fluid flow by the spool 118 in the open center core 130 partially restricts flow to the tank galley 132, and, in turn, increases the pressure of the hydraulic fluid in the open center core 130 being provided at constant flow by the fixed displacement pump 116. The resulting increased hydraulic fluid pressure in the open center core 130 is transmitted hydraulically through the open center/power core passage 140 to the power core 138.

If the chosen spool actuator 120 is activated with the intention of causing the piston 128 to move to a first non-neutral position as illustrated in FIG. 1 (and to thereby, for example, lift a boom and associated load), then not only is the open center core 130 partially restricted to cause an increase in pressure to occur in the open center core 130 and be transmitted to the power core 138, but the spool 118 at the same time opens a hydraulic passage in the valve 114 between associated hydraulic port 122 (hydraulically connected to a cylinder 126 below the piston 128, in the manner illustrated in FIG. 2B) and the power core 138. The hydraulic fluid, having increased hydraulic pressure in the power core 138, is transmitted through associated hydraulic port 122. Simultaneously, activated spool 118 opens a hydraulic passage in the valve 114 between associated hydraulic port 124 (hydraulically connected to a cylinder 126 above the piston 128, in the manner illustrated in FIG. 2B) and the tank galley 132. The result is that hydraulic fluid under pressure from the power core 138 flows through associated hydraulic port 122 and begins filling the cylinder 126 below the piston 128, and hydraulic fluid is permitted to leave the cylinder 126 above the piston 128 by flowing through associated hydraulic port 124 into the tank galley 132 to return to the hydraulic fluid tank 112, where it is available to be re-pumped. By adding pressurized hydraulic fluid to the cylinder 126 below the piston 128, and by reducing hydraulic fluid in the cylinder 126 above the piston 128, the piston 128 and its associated load 134 is lifted.

Conversely, if the chosen spool actuator 120 is activated with the intention of causing the piston to move to a second non-neutral position as illustrated in FIG. 1, (and to, for example, cause a boom to lower), then not only does the activated spool 118 cause the open center core 130 to be partially restricted to cause an increase in fluid pressure in the open center core 130 to be hydraulically transmitted to the power core 138 via open center/power core passage 140, but also the activated spool 118 opens a hydraulic passage in the valve 114 between the associated hydraulic port 124 (hydraulically connected to cylinder 126 above the piston 128) and the power core 138 (with pressurized hydraulic fluid). Simultaneously, the activated spool 118 opens a passage in valve 114 between associated hydraulic port 122 (hydraulically connected to cylinder 126 below the piston 128, in the manner illustrated in FIG. 2C) and the tank galley 132, allowing hydraulic fluid to flow out of the cylinder 126 below the piston 128 to the tank galley 132 and the hydraulic fluid tank 112. The result is that hydraulic fluid under pressure from the power core 138 begins filling the cylinder 126 above the piston 128, and hydraulic fluid begins leaving the cylinder 126 below the piston 128. The piston 128 and its associated load 134 lowers (in this example, the boom and load is lowered).

Because the prior art open center hydraulic valve system 110 illustrated in FIG. 1 utilizes a fixed displacement pump 116 operating at a constant flow for a given engine speed for the equipment on which it is mounted, all power used to generate unused hydraulic fluid flow (such as hydraulic fluid constantly flowing through the open center core 130 when the spools 118 are in the neutral position) is a loss. Nevertheless, the size and power of the fixed displacement pump 116 in such a prior art system must accommodate not only sufficient hydraulic flow and system pressure to operate the multiple functions operated by the valves 114 at rated load conditions, but also must sustain the constant hydraulic flow through the open center core 130 (as well as overcome line losses) in order for the system to operate properly. A relatively large and powerful fixed displacement pump 116 running constantly is therefore required for the prior art open center hydraulic valve system 110. And, as noted above, a considerable portion of the power of the fixed displacement pump 116 in such a system is required to deliver hydraulic fluid flow that is frequently unused by the functions of the system, for example, the unused flow that constantly passes through the open center core 130 to the hydraulic fluid tank 112, only to be re-pumped (when one or more, often all, spools 118 are not activated and the functions are idle). Hence, significant inefficiencies are inherent in the prior art open center hydraulic valve system 110.

A number of factors have spurred equipment manufacturers and hydraulic systems designers to attempt to overcome the inefficiencies and shortcomings of the prior art prior art hydraulic valve systems, including open center hydraulic valve system 110. New emissions standards and a desire for fuel savings have caused designers and manufacturers to attempt to design equipment and hydraulic systems that are more fuel efficient, and more power efficient, by achieving greater horsepower management. Manufacturers and designers likewise desire to avoid significant increases in the size, weight, and expense of providing alternatives to the prior art systems, such as open center hydraulic valve systems 110.

For example, one potential alternative previously considered by designers and manufacturers was to replace the fixed displacement pump 116 of the open center hydraulic valve system 110 illustrated in FIG. 1 with a variable displacement piston pump (not illustrated). In such a potential alternative, however, the existing valves 114 in the prior art open center hydraulic valve system 110 would be required to be replaced by considerably larger, considerably heavier, and considerably more expensive valves in order to permit the higher hydraulic fluid flow required by such a replacement. Such a potential alternative therefore not only was largely rejected as being cost prohibitive, but the installation of such a large, heavy system was determined to be highly undesirable because, in many if not most applications, there is limited room available on equipment for the hydraulic system to be mounted.

The present invention, known as a fixed/variable hybrid system, overcomes the problems associated with both the prior art open center hydraulic valve system 110 and the potential alternatives that have been considered and largely rejected (for example, replacement of the fixed displacement pump 116 with a variable displacement piston pump). The fixed/variable hybrid system of the present invention achieves reduced emissions, greater horsepower management, and greater fuel savings, without greatly increasing the cost, size, or weight of the hydraulic valve system.

BRIEF SUMMARY OF THE INVENTION

In view of the foregoing, it is an object of the embodiments of the invention described herein to provide a hydraulic valve system, called a fixed/variable hybrid system, that overcomes the shortcomings of prior art open center hydraulic valve systems, while still achieving the functions and benefits of prior systems.

It is another object of the embodiments of the fixed/variable hybrid system invention described herein to provide a hydraulic valve system capable of hydraulically operating the functions of heavy off-road equipment, such as earth moving, construction, and forestry equipment, while simultaneously significantly reducing unused hydraulic flow, and thereby significantly reducing the inefficient use of power associated with such unused flow.

It is yet another object of the embodiments of the fixed/variable hybrid system invention described herein to achieve substantially decreased fuel emissions, and substantially increased fuel savings, by reducing inefficient equipment engine usage resulting from power consumption required to provide inefficient hydraulic fluid flow associated with prior art hydraulic systems, such as open center hydraulic valve systems.

Still another object of the embodiments of the fixed/variable hybrid system invention described herein is to achieve the above objects in a manner that is not cost prohibitive, but rather in a manner that is cost-efficient.

A further object of the embodiments of the invention described herein is to achieve the foregoing objects without greatly increasing the size or weight of the hydraulic valve system, as compared to prior art systems such as the open center hydraulic valve system previously discussed.

The disclosed embodiments of the present fixed/variable hybrid system invention achieve the aforementioned objects and others because they include features and combinations not found in prior art hydraulic valve systems, and, in particular, not found in prior art open center hydraulic valve systems.

In the described embodiments of the present invention, an improved hydraulic valve system, called a fixed/variable hybrid system, is provided, wherein the need for a relatively large and inefficient fixed displacement pump to hydraulically power such a system is eliminated. Instead, the fixed/variable hybrid system of the present invention uses modified constant flow open center valve banks ("fixed/variable valves") in conjunction with a relatively small fixed displacement pump coupled with a variable displacement piston pump. The small fixed displacement pump provides hydraulic fluid to an open center core, and also via an open center/power core passage through a check valve to the fixed/variable valves' power cores. The small fixed displacement pump is also ported through a sense signal passage to the load sense signal port of the variable displacement pump. The variable displacement pump, in turn, provides hydraulic fluid flow to one or more fixed/variable valves directly through the fixed/variable valves' power core. Flow from the variable displacement pump to the open center core is blocked by the check valve in the open center/power core passage.

When a particular spool actuator is selected and activated, the selected spool moves to partially restrict or "pinch" the hydraulic fluid flow generated by the small fixed displacement pump through the open center core. The partial flow restriction caused by the spool in the open center core causes fluid pressure to rise in the hydraulic fluid flow provided by the small fixed displacement pump into the open center core. The rise in hydraulic fluid pressure in the open center core is communicated from the open center core through the sense signal passage to the load sense signal port of the variable displacement pump. Depending on the pressure of the hydraulic fluid pressure received through the load sense signal port (for example, depending on how many spools have been activated causing partial restrictions in the open center core, and thereby causing increases in fluid pressure to be transmitted from the open center core via the sense signal passage to the load sense signal port), the increased fluid pressure received in the load sense signal port of the variable displacement piston pump causes the variable displacement piston pump to variably increase its fluid flow to the fixed/variable valves' power cores.

Stated another way, the variable displacement piston pump is responsive to an increase or decrease in fluid pressure transmitted from the open center core through the sense signal passage to the load sense signal port associated with the variable displacement piston pump. The greater the fluid pressure received by the load sense signal port from the small fixed displacement pump through the open center core via the sense signal passage, the more that the variable displacement piston pump increases its flow and pressure to the power core, and vice-versa (within the limitations of the variable displacement piston pump). The small fixed displacement pump also may supply some pressurized hydraulic fluid to the power core through the open center/power core passage. The check valve in the open center/power core passage prevents reverse flow once the pressure in the power core exceeds the pressure in the open center core.

The spools in the fixed/variable valves of the fixed/variable hybrid system are the same as those used in the prior art open center hydraulic valve system, and thus, when activated, operate in the same manner to direct fluid flow from the power core (and to the tank galley) through the pair of hydraulic ports associated with a particular activated spool. As illustrated in schematic diagram in FIG. 3, pressurized hydraulic fluid flow from the power core may be selectively directed by an activated spool to one of a pair of selected hydraulic ports associated with the activated spool. At the same time, hydraulic fluid is permitted to flow from the other hydraulic port associated with the activated spool to the tank galley and to the hydraulic fluid tank.

By eliminating altogether the relatively large fixed displacement pump of the prior art system (which operated constantly and inefficiently at a full and fixed flow), and by substituting a relatively small fixed displacement pump, significant efficiencies are achieved by the fixed/variable hybrid system invention. The small fixed displacement pump is sufficient to provide an increase in hydraulic pressure to the load sense signal port of the variable displacement piston pump (but not necessarily to operate the hydraulic functions associated with the system). Operation of the hydraulic functions is mainly achieved by the variable displacement piston pump operating at higher flow and providing increased hydraulic pressure only when activated by the increase in hydraulic pressure received by the load sense signal port, as provided by the small fixed displacement pump. In other words, the variable displacement piston pump operates at a higher flow only as required, not constantly as in the case of the relatively large fixed displacement pump of the prior art, including the open center hydraulic valve system.

As a result, significant fuel savings and power efficiencies are achieved by the present invention. Simply put, the fixed/variable hybrid system invention described herein utilizes a considerably smaller fixed displacement pump than prior art systems, resulting in less power being wasted pumping hydraulic fluid that is not operating any of the hydraulic functions (e.g., the boom) of the equipment (e.g., a backhoe), such as when the spools of the fixed/variable valves associated with the hydraulic functions are in a neutral position. Instead, the fixed/variable hybrid system utilizes only a small constant flow provided by a small fixed displacement pump, which in turn provides a signal in the form of a pressurized hydraulic fluid through a sense signal passage to a load sense signal port of a variable displacement piston pump to increase fluid flow to power core of the system only as needed upon demand when spool actuators (and their associated spools) are activated to operate an equipment function. Thus, the vast majority of operational power for the fixed/variable hybrid system is utilized only as needed, achieving significant fuel, power, and emission efficiencies. Moreover, the invention's fixed/variable hybrid system does not require any major design overhaul for the fixed/variable valves, or increase in size and weight of the fixed/variable valves, or significant increase in cost of the fixed/variable valves, as would be required if a variable displacement piston pump were to be merely substituted for the fixed displacement pump of the prior art open center hydraulic valve system.

DETAILED DESCRIPTION OF THE INVENTION

Figure 1:
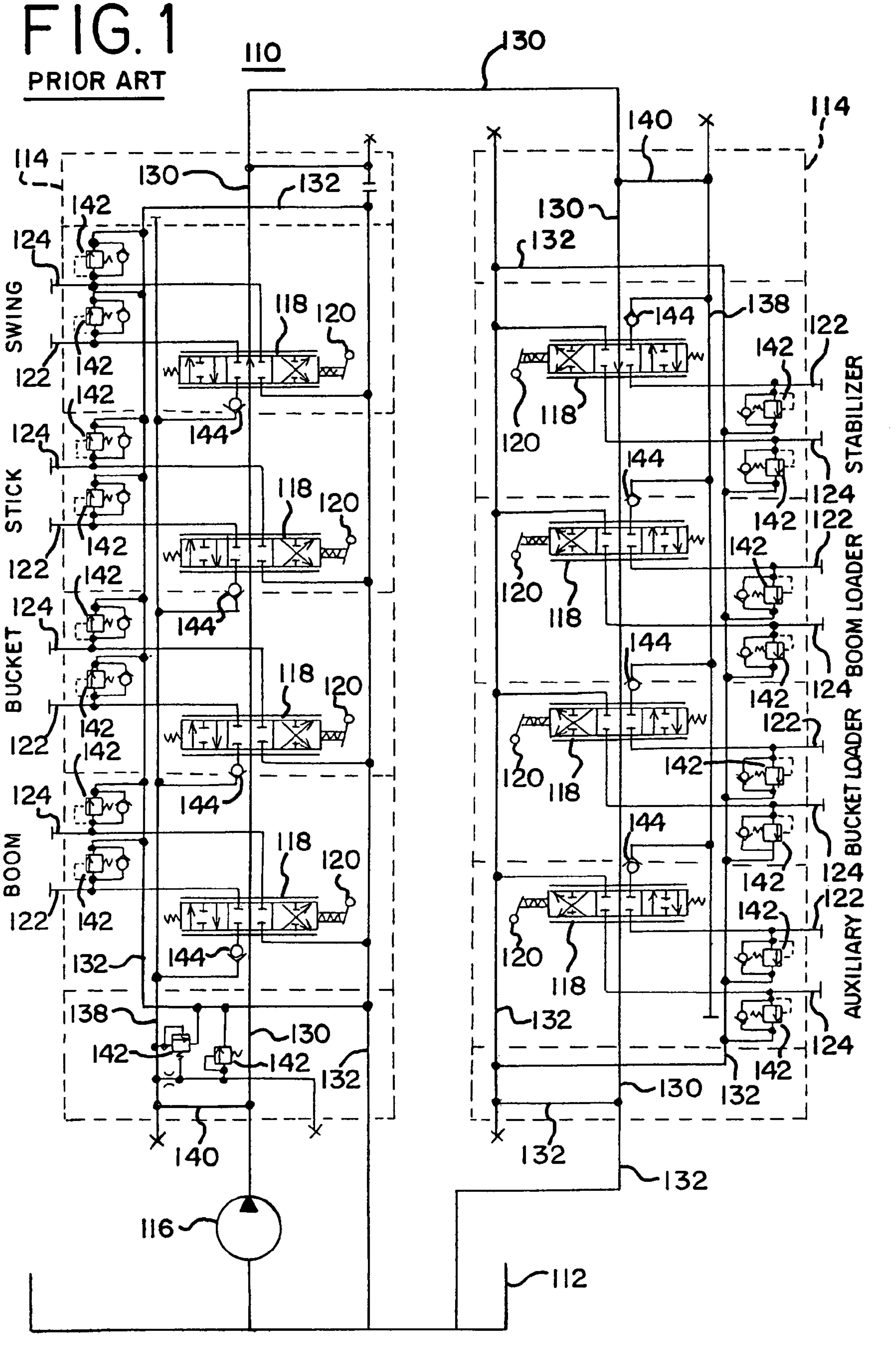
FIG. 1 PRIOR ART
FIG. 1 is a schematic drawing of an embodiment of a prior art open center hydraulic valve system having two valves, eight spools, and eight functions corresponding to the spools.
Figure 2A:
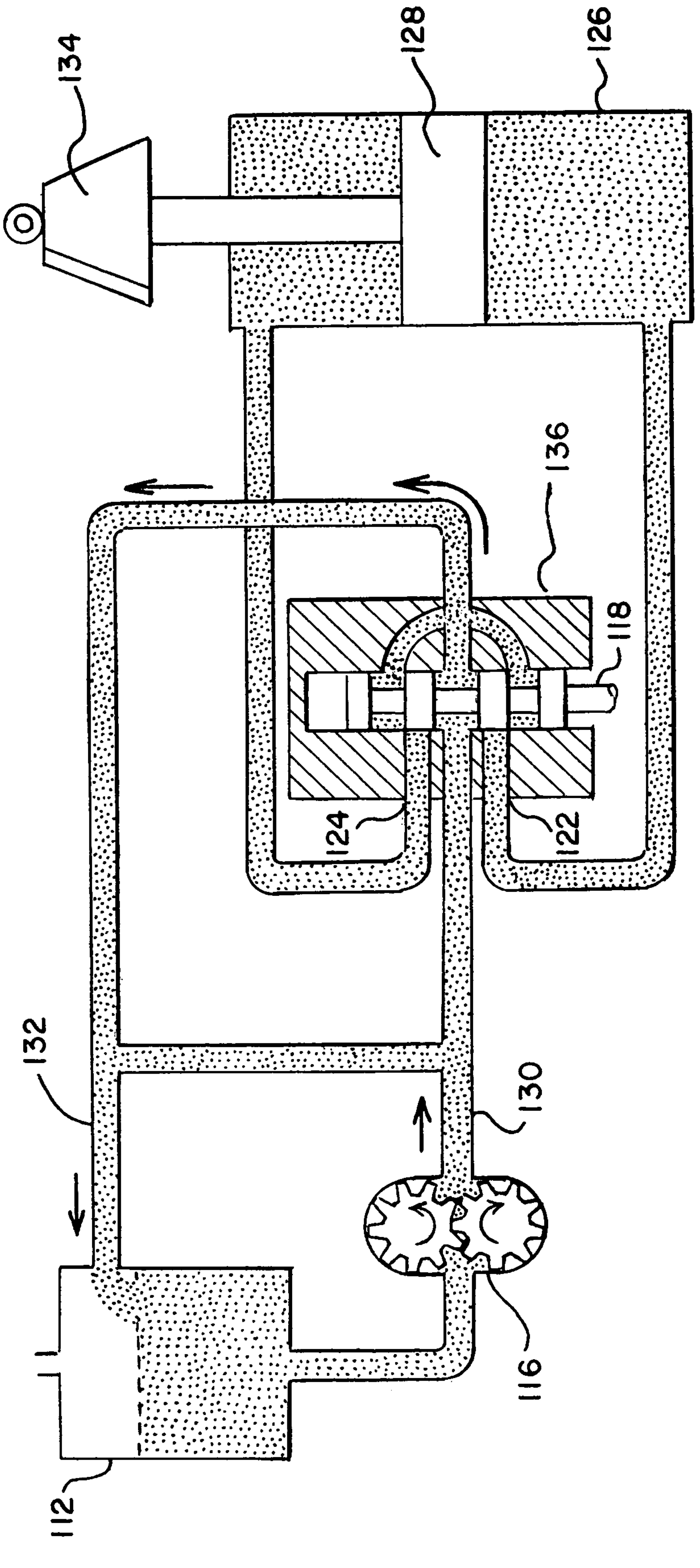
FIG. 2A PRIOR ART
FIG. 2A is a cross-sectional view illustrating the operation of a spool of a prior art simple CFO valve in the neutral position.
Figure 2B:
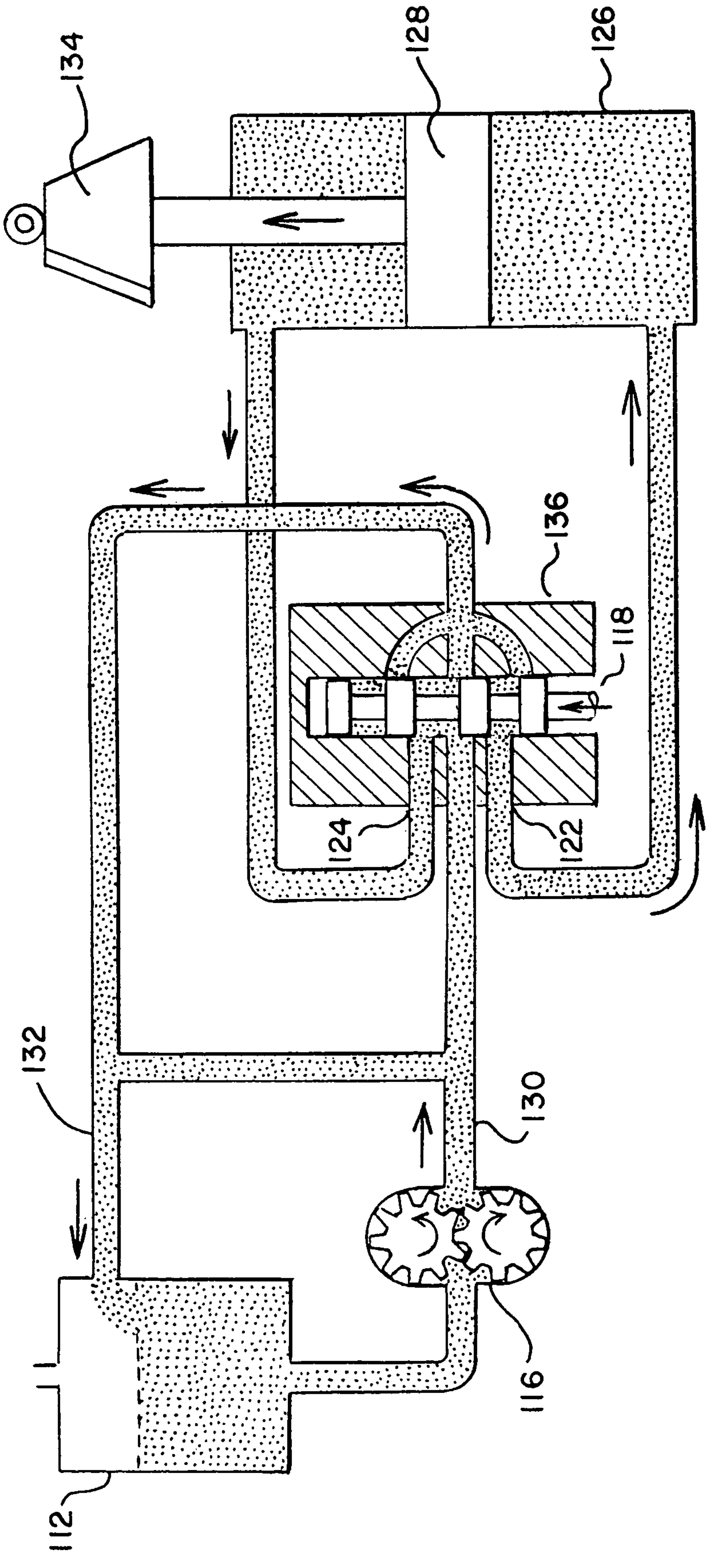
FIG. 2B PRIOR ART
FIG. 2B is a cross-sectional view illustrating the operation of a spool of a prior art simple CFO valve activated in a non-neutral first position to lift a load.
Figure 2C:
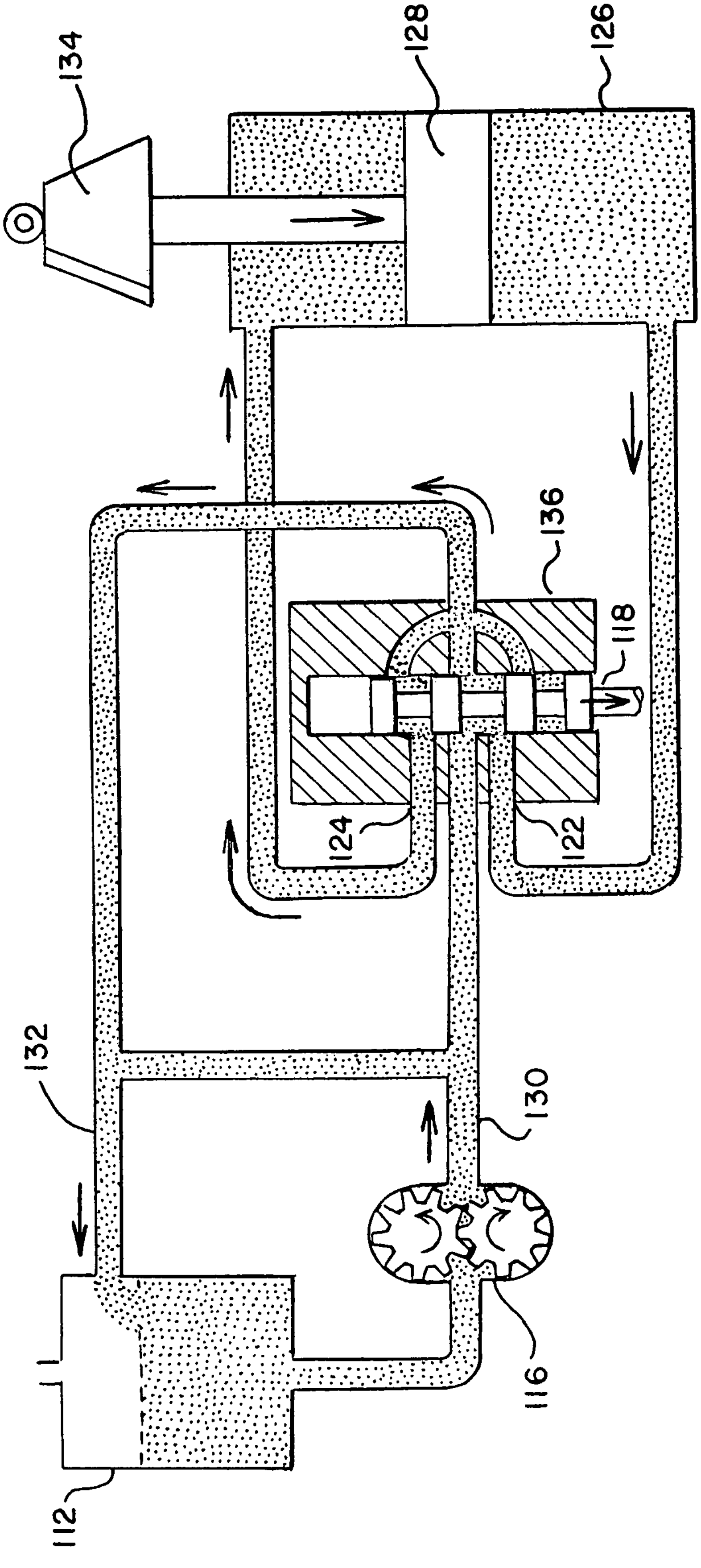
FIG. 2C PRIOR ART
FIG. 2C is a cross-sectional view illustrating the operation of a spool of a prior art simple CFO valve activated in a non-neutral second position to lower a load.
Figure 3:
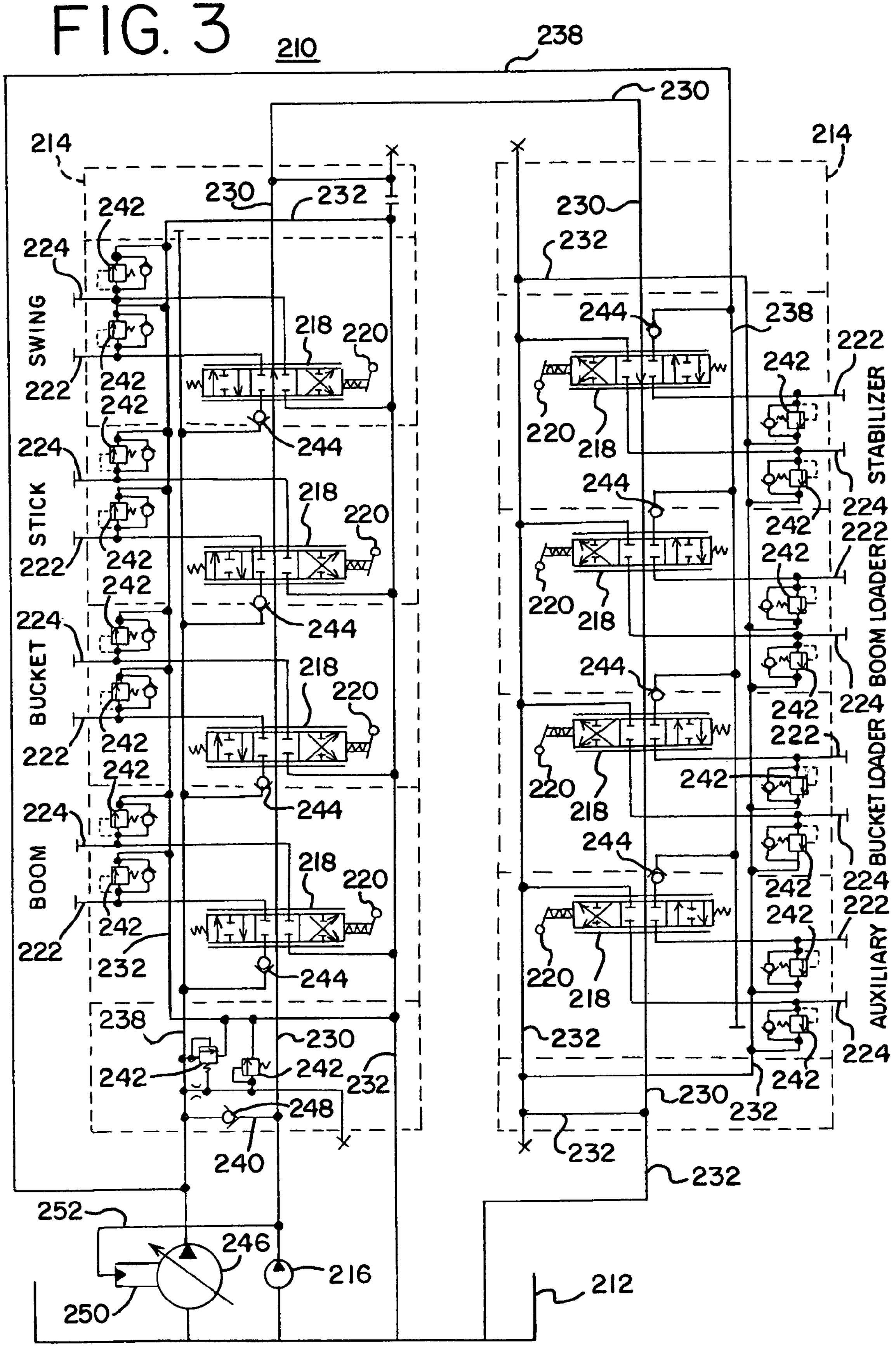
FIG. 3 is a schematic drawing of an embodiment of the fixed/variable hybrid system of the present invention, having two fixed/variable valves, eight spools, and eight functions corresponding to the spools.

An embodiment of the fixed/variable hybrid system 210 of the present invention is illustrated schematically in FIG. 3 in a manner using schematic symbols that would be understood by persons skilled in the art.

Referring to FIG. 3, the fixed/variable hybrid system 210 includes a hydraulic fluid tank 212, one or more standard open center hydraulic valve banks modified in the manner described and illustrated herein ("fixed/variable valves") 214, a small fixed displacement pump 216, and a variable displacement piston pump 246. Each fixed/variable valve 214 may include one or more spools 218, each activated by an associated spool actuator 220. As previously discussed, the spool actuator 220 may be activated by an operator using a variety of known means, including mechanically, electrically, hydraulically, pneumatically, or otherwise.

The fixed/variable hybrid system 210 of the present invention may be housed in a standard manifold (not illustrated) attached to the equipment (e.g., off-road construction, earth moving, or forestry equipment—not illustrated) in which the fixed variable hybrid system 210 is being used. The small fixed displacement pump 216 and variable displacement piston pump 246 may be driven by a power take-off (not illustrated), which, in turn, is mounted to a transmission (not illustrated) connected to the prime mover of the equipment.

Each spool 218 of the fixed/variable hybrid system 210 in FIG. 3 operates in the same manner as described above for spools 118 in the prior art open center hydraulic valve system 110 to provide selective hydraulic communication with hydraulic ports 222 and 224 associated with each spool 218. In a typical application of the invention, each pair of hydraulic ports 222 and 224 communicate hydraulically with a cylinder on opposite sides of a piston to cause piston movement, in a manner similar to that described above for the open center hydraulic valve system 110. In order to prevent undue repetition, to serve the function of brevity, and to avoid belaboring what is known to skilled practitioners in the art, the operation of the hydraulic ports 222 and 224 hydraulically connected to a cylinder on either side of a load-supporting piston in the fixed/variable hybrid system 210 is the same as explained and illustrated for hydraulic ports 122 and 124 hydraulically connected to the cylinder 126 on either side of piston 128, and load 134 in the prior art open center hydraulic valve system 110 previously described and illustrated (see, e.g., FIGS. 1, 2A, 2B, and 2C).

Referring once again to FIG. 3, each spool 218 and associated pair of hydraulic ports 222 and 224 of the fixed/variable valve 214 is associated with a function to be performed by the equipment on which the fixed/variable hybrid system 210 is mounted. Once again, in FIG. 3, the associated functions that are illustrated are those commonly associated with a backhoe: boom, bucket, stick, swing, stabilizer, boom loader, bucket loader, and auxiliary, although skilled practitioners would recognize that the above functions and equipment associated with the fixed/variable hybrid system 210 are provided for illustration purposes, and can vary considerably in actual applications.

An open center core 230 flows through the spools 218 of the fixed/variable valves 214. The fixed/variable valves 214 also include a power core 238 for hydraulic communication of pressurized hydraulic fluid, and a tank galley 232 for return of hydraulic fluid to the hydraulic fluid tank 212 where it becomes available to be re-pumped. Importantly, the provision of hydraulic fluid to the power core 230 of the fixed/variable hybrid system 210 (see FIG. 3) differs significantly from the power core 130 of the open center hydraulic valve system 110 (see FIG. 1). The power core 230 of the fixed/variable hybrid system 210 (see FIG. 3) is ported directly through each fixed/variable valve 214 to the output of variable displacement piston pump 216. This is not true of the power core 130 of the prior art open center hydraulic valve system 110 (see FIG. 1). Referring again to FIG. 3, an open center/power core passage 240 hydraulically connects the open center core 230 and the power core 238. A check valve 248 is located in or adjacent to the open center/power core passage 240 permitting fluid flow in the open center/power core passage 240 from the open center core 230 to the power core 238, but obstructing fluid flow in the opposite direction when the fluid pressure in the power core 238 exceeds that in the open center core 230.

The small fixed displacement pump 216 pumps hydraulic fluid (at a constant rate for a given engine speed) from the hydraulic fluid tank 212 to the open center core 230. As has been discussed, and will be further explained below, the small fixed displacement pump 216 in the fixed/variable hybrid system 210 of the invention is considerably smaller, less expensive, requires less fuel and energy consumption, and thus results in less fuel emissions for a given equivalent equipment application than the relatively larger fixed displacement pump 116 of the prior art open center hydraulic valve system 110.

A variable displacement piston pump 246 pumps hydraulic fluid (at a variable rate, as further explained herein) directly to the power core 238 of each of the fixed/variable valves 214. Associated with the variable displacement piston pump 246 is a load sense signal port 250. The load sense signal port 250 is hydraulically connected to a sense signal passage 252, which, in turn, is hydraulically connected to the open center core 230, preferably between the small fixed displacement pump 216 and the first spool 218 to which the small displacement pump 216 is hydraulically connected. The load sense signal port 250 regulates the hydraulic flow output of the variable displacement piston pump 246 such that as the hydraulic fluid pressure delivered by the sense signal passage 252 to the load sense signal port 250 from the open center core 230 increases, the output flow of hydraulic fluid from the variable displacement piston pump 246 to the power core 238 increases (within the output limits of the variable displacement piston pump 246). Conversely, as the hydraulic fluid pressure delivered by the sense signal passage 252 to the load sense signal port 250 from the open center core 230 decreases, the output flow of hydraulic fluid from the variable displacement piston pump 246 to the power core 238 decreases (within the output limits as well).

The fixed/variable valves 214 may also preferably include smaller internal valves, such as relief valves 242, or load drop check valves 244, in order to avoid overpressure or incorrect flow direction in the fixed/variable hybrid system 210 of the invention. The inclusion of those smaller valves are illustrated and are preferable, but the operation and function of those valves would be understood by a skilled practitioner, and an explanation of the smaller valves would not be material to an understanding of the invention.

The invention's fixed/variable hybrid system 210 illustrated in FIG. 3 operates as described below. When all of the spools 218 of the fixed/variable valves 214 are in the neutral position, the open center core 230 is unrestricted by the spools 218, and, at the same time, each of the spools 218 prevent net fluid flow between their respective associated hydraulic ports 222 and 224, on the one hand, and the power core 238 or the tank galley 232, on the other hand. In that condition, the small fixed displacement pump 216 pumps hydraulic fluid from the hydraulic fluid tank 212, and provides the full constant (for a given engine speed) fluid flow of the small fixed displacement pump 216 through the open center core 230 in an unrestricted manner through the spools 218 of the fixed/variable valves 214, and then to the tank galley 232, returning to the hydraulic fluid tank 212. The power required to operate the small fixed displacement pump 216 is considerably smaller for a given equivalent application as compared to the power required to run the significantly larger fixed displacement pump 116 of the prior art open center hydraulic valve system 110. Thus, less inefficiency occurs as a result of the constantly running small fixed displacement pump 216 (for example, when the spools 218 of the fixed/variable valves 214 are all in the neutral position), because less fuel and power consumption occurs, and less fuel emissions are generated.

When the spools 218 are all in the neutral position, the hydraulic fluid pressure communicated from the open center core 230 through the sense signal passage 252 to the load sense signal port 250 associated with the variable displacement piston pump 246 is at a minimum, and thus the hydraulic fluid flow provided by the variable displacement piston pump 246 is also at a minimum. In this condition, the check valve 248 in the open center/power core passage 240 may permit some fluid flow from the open center core 230 through the open center/power core passage 240 to the power core 238 until the hydraulic fluid pressure in the power core 238 exceeds the pressure in the open center core 230, closing check valve 248.

When an operator chooses to operate a hydraulic function of the equipment on which the fixed/variable hybrid system 210 is mounted, the operator directly or indirectly manipulates the spool actuator 220 associated with that function. The chosen spool actuator 220 operates a spool 218 associated with that spool actuator 220.

If the operator chooses to cause the spool 218 to move to a first non-neutral position, movement of the spool 218 causes several things to occur. Movement of the 218 spool causes a partial restriction of the open center core 230. Because hydraulic fluid is being provided to the open center core 230 at a constant fluid flow by the small fixed displacement pump 216, the hydraulic pressure in the open center core 230 increases upstream of the activated spool 218 (that is, between that activated spool 218 and the small fixed displacement pump 216) that has caused the partial restriction.

The increased hydraulic fluid pressure in the open center core 230 is hydraulically communicated via the sense signal passage 252 to the load sense signal port 250. The increase in hydraulic pressure at the load sense signal port 250 causes the variable displacement piston pump 246 to increase its hydraulic fluid output, thus increasing the hydraulic pressure and flow in the power core 238 to which it is directly connected. Once again, the open center/power core passage 240 and its associated check valve 248 may permit some hydraulic fluid to flow from the partially restricted open center core 230 to the power core 238 until such time as the pressure in the power core 238 exceeds the pressure in the now partially restricted (by the activated spool 218) open center core 230, closing check valve 248.

At the same time, when activated spool 218 is moved to the first non-neutral position, the spool 218 opens a hydraulic passage through the fixed/variable valve 214 between the power core 238 and the first hydraulic port 222 associated with the activated spool 218, causing hydraulic fluid under pressure (delivered mainly by the variable displacement piston pump 246 through the power core 238) to flow from the power core 238 to the associated first hydraulic port 222. In the first non-neutral position, the activated spool 218 continues to obstruct the passage through the fixed/variable valve 214 between the power core 238 and the second hydraulic port 224 associated with the activated spool 218. In that first position, however, the activated spool 218 opens a hydraulic passage through the fixed/variable valve 214 between the tank galley 232 and the second hydraulic port 224 associated with the activated spool 218, permitting hydraulic fluid to flow from the second hydraulic port 224 through the tank galley 232 to the hydraulic fluid tank 212. At the same time, activated spool 218 in the first position obstructs the hydraulic fluid pathway between the tank galley 232 and the first hydraulic port 222.

In an example where the first hydraulic port 222 associated with the activated spool 218 is hydraulically connected to a cylinder at a location below a piston, and the second associated hydraulic port 224 is hydraulically connected to a cylinder at a location above a piston, the hydraulic fluid under pressure flows into the cylinder through the first associated hydraulic port 222 below the piston, and hydraulic fluid flows out of the cylinder through the second associated hydraulic port 224 above the piston, causing the piston (and associated load) to rise. If, in this example, the operator has chosen the spool actuator 220 associated with the boom on a backhoe, the fixed/variable hybrid system 210 would cause the backhoe's boom to rise.

If, on the other hand, the operator chooses to use a spool actuator 220 to cause the spool 218 to move in a second non-neutral position (e.g., in a non-neutral position opposite from the first direction), movement of the activated spool 218 in the second non-neutral position once again causes several results. Movement of the activated spool 218 to a second non-neutral position would again cause a partial restriction of the open center core 230 of the fixed/variable valve 214. The constant fluid flow provided by the small fixed displacement pump 216 through the now-partially restricted open center core 230 causes the fluid pressure to increase in the open center core 230 between the activated spool 218 and the small fixed displacement pump 216.

The sense signal passage 252 hydraulically communicates the increase in hydraulic fluid pressure from the open center core 230 through the sense signal passage 252 to the load sense signal port 250 associated with the variable displacement piston pump 246. This causes the variable displacement piston pump 246 to increase the rate of hydraulic fluid output to the power core 238 to which it is directly connected, increasing the hydraulic pressure therein. Also, some hydraulic fluid may flow from open center core 230 through the open center/power core passage 240 and its associated check valve 248 to the power core 238 until the pressure in the power core 238 exceeds the pressure in the open center core 230, closing check valve 248.

When the operator causes spool 218 to move to the second non-neutral position, the activated spool 218 is moved so that, in addition to the partial restriction of the open center core 230 described above, the activated spool 218 moves to a position where a hydraulic passage through the fixed/variable valve 214 is opened between the power core 238 and the second hydraulic port 224 associated with the activated spool 218, causing the hydraulic fluid under pressure in the power core 238 (delivered mostly by the increased fluid flow from the variable displacement piston pump 216) to flow from the power core 238 to the associated second hydraulic port 224. The activated spool 218, in the second position, obstructs the hydraulic passage through the fixed/variable valve 214 between the power core 238 and the first hydraulic port 222 associated with the activated spool 218. The activated spool 218 also obstructs the hydraulic fluid pathway between the tank galley 232 and the second hydraulic port 224 associated with the activated spool 218. But in the second non-neutral position, the activated spool 218 opens a hydraulic passage through the fixed/variable valve between the tank galley 232 and the first hydraulic port 222 associated with the activated spool 218, allowing hydraulic fluid to flow from the first hydraulic port 222 associated with the activated spool 218 through the tank galley 232 to the hydraulic fluid tank 212.

If the hydraulic ports are hydraulically connected to a cylinder having a piston in the manner described in the previous example, that is, with the first hydraulic port 222 associated with the activated spool 218 being connected below the piston, and the second hydraulic port 224 associated with the activated spool 218 being connected above the piston, then hydraulic fluid under pressure will flow from the power core 238 through the second hydraulic port 224 associated with the activated spool 218 into the cylinder above the piston, and hydraulic fluid will flow out of the cylinder below the piston through the first hydraulic port 222 associated with the activated spool 218 via the tank galley 232 to the hydraulic fluid tank 212. The increase in hydraulic fluid in the cylinder above the piston and decrease in hydraulic fluid in the cylinder below the piston will cause the piston, and any associated load, to lower. If, as in the previous example, the operator chose to activate (via a spool actuator 220) the spool 218 associated with a boom, that boom, as powered by the fixed/variable hybrid system 210 of the invention, would lower.

While a single spool actuator 220 associated with a single spool 218 associated with a single function was provided as an example to illustrate the operation of the fixed/variable hybrid system 210, persons skilled in the art will recognize that different spools 218 associated with different functions may be activated in the same manner, and those will not be separately discussed.

In the event that more than one spool 218 is activated at the same time in the fixed/variable hybrid system of the present invention, further partial restriction of the open center core 230 would occur because of the multiple partial restrictions resulting from multiple activated spools 218. The further partial restrictions of the open center core 230 of the constant fluid flow (for a given engine speed) provided by the small fixed displacement pump 216 would cause the fluid pressure in the open center core 238 to further increase to a pressure greater than the pressure occurring when only one spool 218 was activated. Stated another way, more activated spools 218 cause greater partial restrictions in the open center core 238 resulting in greater fluid pressure within the open center core 238. This greater fluid pressure in the open center core 238 is communicated hydraulically via the sense signal passage 252 to the load sense signal port 250 of the variable displacement piston pump 246.

As discussed previously, greater fluid pressure received by the load sense signal port 250 causes the variable displacement piston pump 246 to increase its hydraulic fluid flow output to the power core 238, increasing the fluid flow and pressure in the power core 238. This increase in pressure in the power core 238 serves to hydraulically power the various functions of the multiple activated spools 218.

When multiple spools 218 are activated, once again, some fluid flow may occur from the open center core 230 through the open center/power core passage 240 and its associated check valve 248 to the power core 238 until the point that the pressure in the power core 238 exceeds the pressure in the open center core 230, closing check valve 248.

The advantages of the embodiments of the fixed/variable hybrid system 210 invention herein are significant. The inefficiencies of prior art hydraulic systems, such as the prior art open center hydraulic valve system 110, are largely overcome. Instead of a relatively large fixed displacement pump 116 operating constantly at a fixed rate, consuming power and fuel, and causing emissions, at the constant rate required by the relatively large fixed displacement pump 116, the fixed/variable hybrid system 210 utilizes a relatively small fixed displacement pump 216, consuming considerably less power and fuel, and therefore emitting considerably less fuel emissions.

The prior art fixed displacement pump 116 needed to generate sufficient hydraulic fluid flow (needed to be sufficiently large and powerful) to operate all equipment functions (multiple functions at one time) at rated load, and to satisfy line losses. That larger pump was required to run at full and constant flow at all times during operation. The small fixed displacement pump 216 of the present invention only needs to be sufficiently large to generate a hydraulic pressure increase (essentially, a hydraulic pressure signal) through the sense signal passage 252 to the load sense signal port 250 (and to satisfy line losses), therefore, only a small fixed displacement pump 216 is required to run constantly. Hydraulic fluid flow to power the functions of the equipment is supplied only on an "as needed" basis by the variable displacement piston pump 246, resulting in considerable savings in fuel, and considerable reduction in emissions (as a result of running the engine to power the respective pumps). This is especially important as the rated load capacities increase for the equipment in which the fixed/variable hybrid system 210 is used.

Moreover, unlike other potential alternatives that seek to overcome the shortcomings of the prior art, such as mere substitution of a variable displacement piston pump for a fixed displacement pump in an open center hydraulic valve system, the fixed/variable hybrid system 210 of the present invention does not require redesigning or other major overhauls of the design of the constant flow open center valve banks to greatly increase the size of the valves. This potential alternative has inherent significant problems due to the limited space available for hydraulic valve systems on the equipment on which it is typically mounted. Stated another way, bulky and heavy potential alternatives are not acceptable because they often will not fit on the equipment on which they are required. Furthermore, the considerable added expense of the required resized valves for such a system makes such a potential alternative highly undesirable.

In sum, the fixed/variable hybrid system 210 of the present invention is a significant improvement over the prior art, and is superior to other alternatives seeking to overcome the shortcomings of the prior art. The present invention provides significant benefits in fuel efficiency, horsepower management, decreased emissions, reduced cost of manufacture (compared to resized/redesigned valves), and reduced size/weight (compared to resized/redesigned valves).

While the above-described embodiments of the fixed/variable hybrid system 210 invention have been found and are believed to be useful and preferable, particularly in certain application using the invention in connection with off-road earth moving, construction, and forestry equipment, skilled practitioners will recognize that other combinations of elements, dimensions, or materials can be utilized, and other equipment applications can be realized, without departing from the invention claimed herein. Moreover, although certain embodiments of the invention have been described by way of example, it will be understood by skilled practitioners that modifications may be made to the disclosed embodiments without departing from the scope of the invention, which is defined by the claims.

Having thus described exemplary embodiments of the invention, that which is desired to be secured by Letters Patent is claimed below.

I claim:

1. A fixed/variable hybrid system for operation of hydraulic equipment, comprising:

(1) one or more fixed/variable valves, with each of the fixed/variable valves having one or more spools;

(2) a fixed displacement pump, which pumps hydraulic fluid at a constant rate from a hydraulic fluid tank, and which is hydraulically connected to an open center core in each of the fixed/variable valves;

(3) a variable displacement piston pump, having associated therewith a load sense signal port, wherein the variable displacement piston pump pumps hydraulic fluid at a variable rate from the hydraulic fluid tank to a power core in each of the fixed/variable valves, and wherein an increase in hydraulic fluid pressure received by the load sense signal port causes the variable displacement piston pump to pump hydraulic fluid at an increased rate, and wherein a decrease in hydraulic fluid pressure received by the load sense signal port causes the variable displacement piston pump to pump hydraulic fluid at decreased rate;

(4) a tank galley in each of the fixed/variable valves that delivers hydraulic fluid to the hydraulic fluid tank;

(5) an open center/power core passage hydraulically connecting the open center core and the power core associated with each of the fixed/variable valves, wherein, for each of the fixed/variable valves, the hydraulic connection between the open center core and the open center/power core passage is located between the fixed displacement pump and the first spool of the first fixed/variable valve downstream of the fixed displacement pump in the open center core;

(6) a sense signal passage hydraulically connecting the open center core and the load sense signal port, wherein the hydraulic connection between the sense signal passage and the open center core is located between the fixed displacement pump and the first spool of the first fixed/variable valve downstream of the fixed displacement pump in the open center core;

(7) wherein the open center core is hydraulically connected to the tank galley downstream of the last spool of the last fixed/variable valve downstream of the fixed displacement pump in the open center core;

(8) wherein each spool in each fixed/variable valve has associated therewith:

(A) a first hydraulic port and a second hydraulic port;

(B) a first spool passage between the power core and the first hydraulic port associated with the spool, that is capable of being opened or closed depending upon the position of the spool;

(C) a second spool passage between the power core and the second hydraulic port associated with the spool, that is capable of being opened or closed depending upon the position of the spool;

(D) a third spool passage between the tank galley and the first hydraulic port associated with the spool, that is capable of being opened or closed depending upon the position of the spool;

(E) a fourth spool passage between the tank galley and the second hydraulic port associated with the spool, that is capable of being opened or closed depending upon the position of the spool;

(F) a fifth spool passage, wherein the open center core passes through the fifth spool passage, and wherein, depending upon the position of the spool, the spool may permit hydraulic fluid to flow through the fifth spool passage and the open center core in an unrestricted manner, or the spool may partially restrict the hydraulic fluid flowing through the fifth spool passage and the open center core;

(9) wherein each spool has at least a neutral position, a first non-neutral position, and a second non-neutral position, wherein:

(A) in the neutral position, the spool permits hydraulic fluid to flow through the fifth spool passage and the open center core passing therethrough in an unrestricted manner, and the spool blocks the flow of hydraulic fluid through the first spool passage, the second spool passage, the third spool passage, and the fourth spool passage, (B) in the first non-neutral position, the spool partially restricts the flow of hydraulic fluid through the fifth spool passage and the open center core passing therethrough, the spool opens the first spool passage between the power core and the first hydraulic port associated with the spool allowing hydraulic fluid to flow from the power core to the first hydraulic port, the spool opens the fourth spool passage between the tank galley and the second hydraulic port associated with the spool allowing hydraulic fluid to flow from the second hydraulic port to the tank galley, the spool closes the second spool passage between the power core and the second hydraulic port associated with the spool, and the spool closes the third spool passage between the tank galley and the first hydraulic port associated with the spool; and (C) in the second non-neutral position, the spool partially restricts the flow of hydraulic fluid through the fifth spool passage and the open center core passing therethrough, the spool opens the second spool passage between the power core and the second hydraulic port associated with the spool allowing hydraulic fluid to flow from the power core to the second hydraulic port, the spool opens the third spool passage between the tank galley and the first hydraulic port associated with the spool allowing hydraulic fluid to flow from the first hydraulic port to the tank galley, the spool closes the first spool passage between the power core and the first hydraulic port associated with the spool, and the spool closes the fourth spool passage between the tank galley and the second hydraulic port associated with the spool;

(10) wherein when activation of one or more of the spools of one or more of the fixed/variable valves occurs in a manner causing said one or more of the of the activated spools to be in the first non-neutral position, each of the spools so activated causes a partial restriction in the fifth spool passage of each of the activated spools in the first non-neutral position and in the open center core passing therethrough, (A) causing the hydraulic fluid pumped at a constant rate by the fixed displacement pump through the open center core to increase in pressure between the fixed displacement pump and the one or more restrictions caused by each of said activated spools that are in the first non-neutral position, (B) further causing the increased hydraulic fluid pressure in the open center core to be hydraulically communicated through the sense signal passage to the load sense signal port, (C) with the increase in hydraulic fluid pressure received by the load sense signal port causing the variable displacement piston pump to pump hydraulic fluid at an increased rate to the power core of each of the fixed variable valves, increasing the hydraulic fluid flow and hydraulic fluid pressure in the power core, (D) wherein each of the activated spools in the first non-neutral position permits hydraulic fluid in the power core having increased pressure to flow through the open first spool passage to the first hydraulic port associated with each activated spool in the first non-neutral position; and

(11) wherein when activation of one or more of the spools of one or more of the fixed/variable valves occurs in a manner causing said one or more of the activated spools to be in the second non-neutral position, each of the spools so activated causes a partial restriction in the fifth spool passage of each of the activated spools in the second non-neutral position and in the open center core passing therethrough, (A) causing the hydraulic fluid pumped at a constant rate by the fixed displacement pump through the open center core to increase in pressure between the fixed displacement pump and the one or more restrictions caused by each of said activated spools that are in the second non-neutral position, (B) further causing the increased hydraulic fluid pressure in the open center core to be hydraulically communicated through the sense signal passage to the load sense signal port, (C) with the increase in hydraulic fluid pressure received by the load sense signal port causing the variable displacement piston pump to pump hydraulic fluid at an increased rate to the power core of each of the fixed variable valves, increasing the hydraulic fluid flow and hydraulic fluid pressure in the power core, (D) wherein each of the activated spools in the second non-neutral position permits hydraulic fluid in the power core having increased pressure to flow through the open second spool passage to the second hydraulic port associated with each activated spool in the second non-neutral position.

2. The fixed/variable hybrid system of claim 1 wherein the open center/power core passage further comprises a check valve that permits hydraulic fluid to flow through the open center/power core passage from the open center core to the power core when the hydraulic fluid pressure in the open center core exceeds the hydraulic fluid pressure in the power core.

3. The fixed/variable hybrid system of claim 2 wherein the check valve prevents hydraulic fluid from flowing through the open center/power core passage from the power core to the open center core when the hydraulic fluid pressure in the power core exceeds the hydraulic fluid pressure in the open center core.

4. The fixed/variable hybrid system of claim 1 wherein the maximum pump output of the fixed displacement pump is less than the maximum pump output of the variable displacement piston pump.

5. The fixed/variable hybrid system of claim 1 wherein each of the spools in each of the fixed/variable valves has associated therewith a spool activator, wherein each of said spool activators is capable of causing movement of the spool associated therewith to either a neutral position, a first non-neutral position, or a second non-neutral position.

6. A fixed/variable hybrid system for operation of hydraulic equipment, comprising:

(1) one or more fixed/variable valves, with each of the fixed/variable valves having one or more spools;

(2) a fixed displacement pump, which pumps hydraulic fluid at a constant rate from a hydraulic fluid tank, and which is hydraulically connected to an open center core in each of the fixed/variable valves;

(3) a variable displacement piston pump, wherein the variable displacement piston pump pumps hydraulic fluid at a variable rate from the hydraulic fluid tank to a power core in each of the fixed/variable valves;

(4) a tank galley in each of the fixed/variable valves that delivers hydraulic fluid to the hydraulic fluid tank;

(5) an open center/power core passage hydraulically connecting the open center core and the power core associated with each of the fixed/variable valves, wherein, for each of the fixed/variable valves, the hydraulic connection between the open center core and the open center/power core passage is located between the fixed displacement pump and the first spool of the first fixed/variable valve downstream of the fixed displacement pump in the open center core;

(6) wherein the open center core is hydraulically connected to the tank galley downstream of the last spool of the last fixed/variable valve downstream of the fixed displacement pump in the open center core;

(7) wherein each spool in each fixed/variable valve has associated therewith:

(A) a first hydraulic port and a second hydraulic port;

(B) a first spool passage between the power core and the first hydraulic port associated with the spool, that is capable of being opened or closed depending upon the position of the spool;

(C) a second spool passage between the power core and the second hydraulic port associated with the spool, that is capable of being opened or closed depending upon the position of the spool;

(D) a third spool passage between the tank galley and the first hydraulic port associated with the spool, that is capable of being opened or closed depending upon the position of the spool;

(E) a fourth spool passage between the tank galley and the second hydraulic port associated with the spool, that is capable of being opened or closed depending upon the position of the spool;

(F) a fifth spool passage, wherein the open center core passes through the fifth spool passage, and wherein, depending upon the position of the spool, the spool may permit hydraulic fluid to flow through the fifth spool passage and the open center core in an unrestricted manner, or the spool may partially restrict the hydraulic fluid flowing through the fifth spool passage and the open center core;

(8) wherein each spool has at least a neutral position, a first non-neutral position, and a second non-neutral position, wherein:

(A) in the neutral position, the spool permits hydraulic fluid to flow through the fifth spool passage and the open center core passing therethrough in an unrestricted manner, and the spool blocks the flow of hydraulic fluid through the first spool passage, the second spool passage, the third spool passage, and the fourth spool passage, (B) in the first non-neutral position, the spool partially restricts the flow of hydraulic fluid through the fifth spool passage and the open center core passing therethrough, the spool opens the first spool passage between the power core and the first hydraulic port associated with the spool allowing hydraulic fluid to flow from the power core to the first hydraulic port, the spool opens the fourth spool passage between the tank galley and the second hydraulic port associated with the spool allowing hydraulic fluid to flow from the second hydraulic port to the tank galley, the spool closes the second spool passage between the power core and the second hydraulic port associated with the spool, and the spool closes the third spool passage between the tank galley and the first hydraulic port associated with the spool; and (C) in the second non-neutral position, the spool partially restricts the flow of hydraulic fluid through the fifth spool passage and the open center core passing therethrough, the spool opens the second spool passage between the power core and the second hydraulic port associated with the spool allowing hydraulic fluid to flow from the power core to the second hydraulic port, the spool opens the third spool passage between the tank galley and the first hydraulic port associated with the spool allowing hydraulic fluid to flow from the first hydraulic port to the tank galley, the spool closes the first spool passage between the power core and the first hydraulic port associated with the spool, and the spool closes the fourth spool passage between the tank galley and the second hydraulic port associated with the spool;

(9) wherein when activation of one or more of the spools of one or more of the fixed/variable valves occurs in a manner causing said one or more of the of the activated spools to be in the first non-neutral position, each of the spools so activated causes a partial restriction in the fifth spool passage of each of the activated spools in the first non-neutral position and in the open center core passing therethrough, (A) causing the hydraulic fluid pumped at a constant rate by the fixed displacement pump through the open center core to increase in pressure between the fixed displacement pump and the one or more restrictions caused by each of said activated spools that are in the first non-neutral position, (B) wherein the variable displacement piston pump pumps hydraulic fluid at an increased rate to the power core of each of the fixed variable valves, increasing the hydraulic fluid flow and hydraulic fluid pressure in the power core, and (C) wherein each of the activated spools in the first non-neutral position permits hydraulic fluid in the power core having increased pressure to flow through the open first spool passage to the first hydraulic port associated with each activated spool in the first non-neutral position; and

(10) wherein when activation of one or more of the spools of one or more of the fixed/variable valves occurs in a manner causing said one or more of the activated spools to be in the second non-neutral position, each of the spools so activated causes a partial restriction in the fifth spool passage of each of the activated spools in the second non-neutral position and in the open center core passing therethrough, (A) causing the hydraulic fluid pumped at a constant rate by the fixed displacement pump through the open center core to increase in pressure between the fixed displacement pump and the one or more restrictions caused by each of said activated spools that are in the second non-neutral position, (B) wherein the variable displacement piston pump pumps hydraulic fluid at an increased rate to the power core of each of the fixed variable valves, increasing the hydraulic fluid flow and hydraulic fluid pressure in the power core, and (C) wherein each of the activated spools in the second non-neutral position permits hydraulic fluid in the power core having increased pressure to flow through the open second spool passage to the second hydraulic port associated with each activated spool in the second non-neutral position.

7. The fixed/variable hybrid system of claim 6 wherein the open center/power core passage further comprises a check valve that permits hydraulic fluid to flow through the open center/power core passage from the open center core to the power core when the hydraulic fluid pressure in the open center core exceeds the hydraulic fluid pressure in the power core.

8. The fixed/variable hybrid system of claim 7 wherein the check valve prevents hydraulic fluid from flowing through the open center/power core passage from the power core to the open center core when the hydraulic fluid pressure in the power core exceeds the hydraulic fluid pressure in the open center core.

9. The fixed/variable hybrid hydraulic system of claim 8 further comprising:

(1) a load sense signal port associated with the variable displacement piston pump, wherein an increase in hydraulic fluid pressure received by the load sense signal port cause the variable displacement piston pump to pump hydraulic fluid at an increased rate, and wherein a decrease in hydraulic fluid pressure received by the load sense signal port causes the variable displacement pump to pump hydraulic fluid at a decreased rate;

(2) a sense signal passage hydraulically connecting the open center core and the load sense signal port, wherein the hydraulic connection between the sense signal passage and the open center core is located between the fixed displacement pump and the first spool of the first fixed/variable valve downstream of the fixed displacement pump in the open center core;

(3) wherein when activation of one or more of the spools of one or more of the fixed/variable valves occurs in a manner causing one or more of the activated spools to be in either a first non-neutral position, or a second non-neutral position, increased hydraulic fluid pressure in the open center core is hydraulically communicated through the sense signal passage to the load sense signal port.

10. The fixed/variable hybrid system of claim 6 wherein the maximum pump output of the fixed displacement pump is less than the maximum pump output of the variable displacement piston pump.

11. The fixed/variable hybrid hydraulic system of claim 6 wherein each of the spools in each of the fixed/variable valves has associated therewith a spool activator, wherein each of said spool activators is capable of causing movement of the spool associated therewith to either a neutral position, a first non-neutral position, or a second non-neutral position.

12. The fixed/variable hybrid hydraulic system of claim 10 wherein each of the spools in each of the fixed/variable valves has associated therewith a spool activator, wherein each of said spool activators is capable of causing movement of the spool associated therewith to either a neutral position, a first non-neutral position, or a second non-neutral position.

* * * * *